United States Patent [19]
Witte et al.

[11] 3,933,074
[45] Jan. 20, 1976

[54] FATIGUE IMPROVEMENT NUT

[75] Inventors: Erwin C. Witte, Placentia; Paul V. Pagel, Fullerton, both of Calif.

[73] Assignee: Kaynar Manufacturing Co., Inc., Fullerton, Calif.

[22] Filed: Dec. 9, 1974

[21] Appl. No.: 530,947

[52] U.S. Cl. .................................... 85/32 T; 151/9
[51] Int. Cl.² .......................................... F16B 31/04
[58] Field of Search ........ 85/32 T, 32 V, 1 T; 151/9

[56] References Cited
UNITED STATES PATENTS

| | | | |
|---|---|---|---|
| 579,547 | 3/1897 | Perry | 151/9 |
| 1,544,132 | 6/1925 | Cook | 151/9 |
| 2,601,651 | 6/1952 | Wandy | 151/9 |

FOREIGN PATENTS OR APPLICATIONS

| | | | |
|---|---|---|---|
| 794,273 | 4/1958 | United Kingdom | 85/32 T |
| 242,609 | 9/1969 | U.S.S.R. | 85/32 T |

*Primary Examiner*—Marion Parsons, Jr.
*Attorney, Agent, or Firm*—Harness, Dickey & Pierce

[57] ABSTRACT

The threads at the entrance end of a nut are interrupted by a plurality of circumferentially spaced axially extending flutes to form relatively flexible load distributing threads. The flutes extend axially across a limited number of threads and extend radially into the threads a distance short of the root of the thread. After engagement with a complimentary bolt, and upon the occurrence of a load on the connection, the interrupted threads flex axially of the nut to cushion shock on the bolt threads and shift the zone of maximum stress transfer axially inwardly of the nut, thereby materially extending fatigue life of the connection.

5 Claims, 14 Drawing Figures

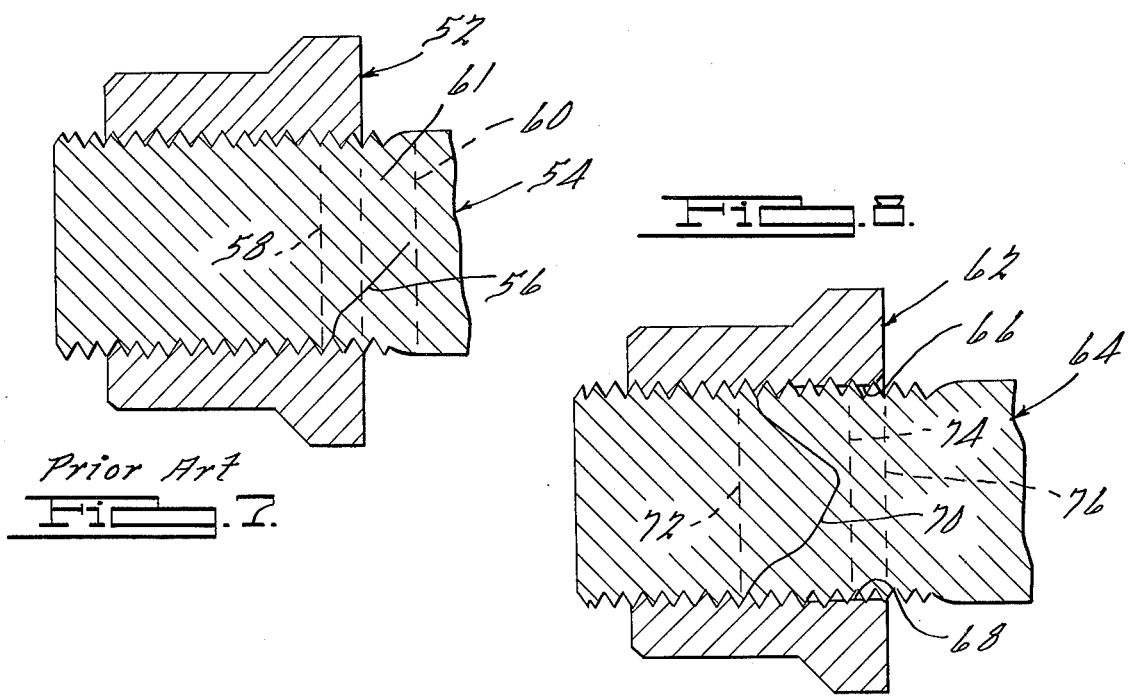
Prior Art
FIG. 7.
FIG. 8.
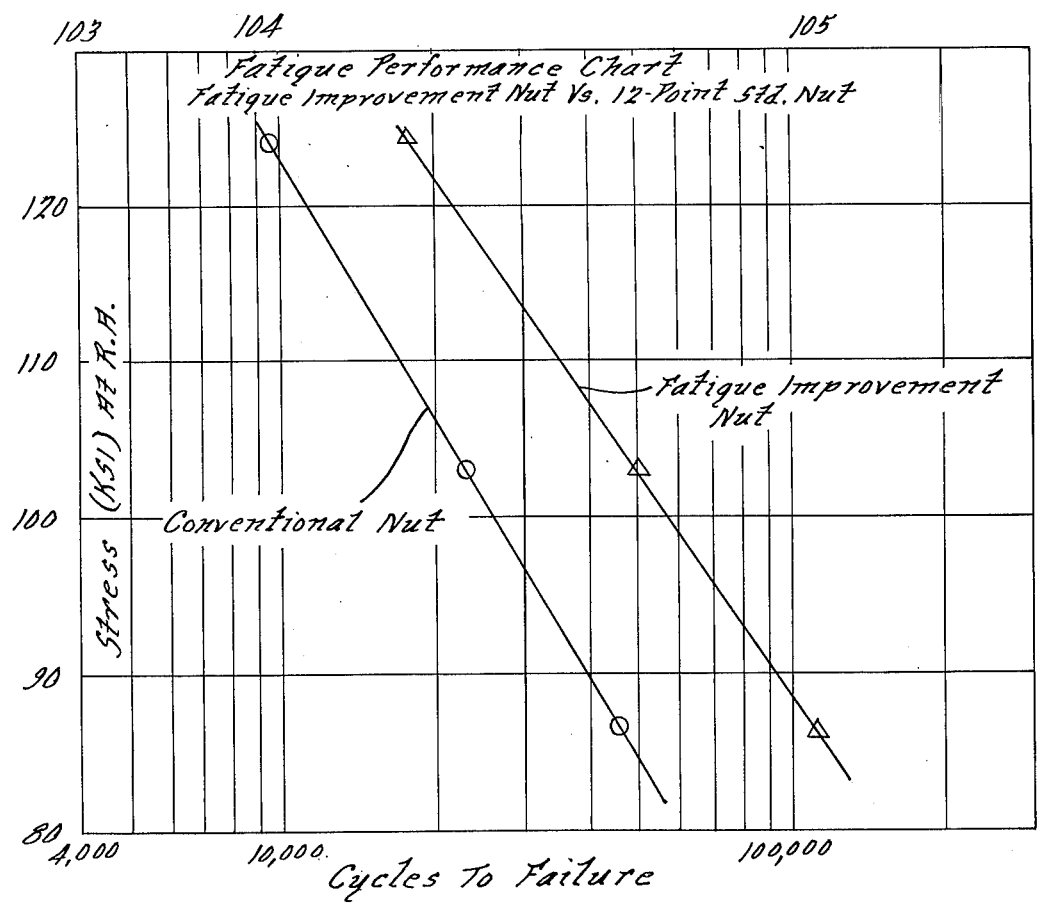
FIG. 9.

FATIGUE IMPROVEMENT NUT

BACKGROUND OF THE INVENTION

Fatigue failure of a nut-bolt connection characteristically occurs at the interface between the engaged and non-engaged threads of the bolt since relatively high stress levels are found adjacent the first and second mated threads thereof. By creating a degree of flexibility or "buffer zone" in the first several threads of the nut, while maintaining required tensile strength characteristics, the stress level at the interface between the engaged and unengaged portions of the bolt is reduced. Such flexibility effects a relatively uniform load distribution and transfer of stress to all of the mating threads.

DESCRIPTION OF THE DRAWINGS

FIG. 7 is a sectional view of a conventional nut and bolt combination illustrating a typical fatigue failure of the bolt.

FIG. 8 is a sectional view of a nut and bolt combination utilizing the nut of the instant invention and showing the improved fatigue failure characteristic.

FIG. 9 is a graph showing the improved fatigue characteristic of the nut of the instant invention.

DESCRIPTION OF THE PREFERRED EMBODIMENTS

Figure 1:
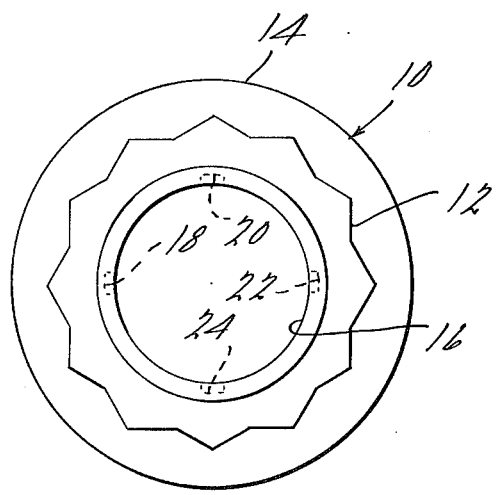
FIG. 1 is a plan view of a fatigue improvement nut wherein the first four threads are interrupted by flutes at the entrance end thereof in accordance with the present invention.

As best seen in FIG. 1 of the drawings, a nut 10 has a body portion 12 with a twelve point wrenching surface thereon and a flange 14 at one end thereof. The nut 10 has a central bore with a standard thread 16 therein.

Figure 2:
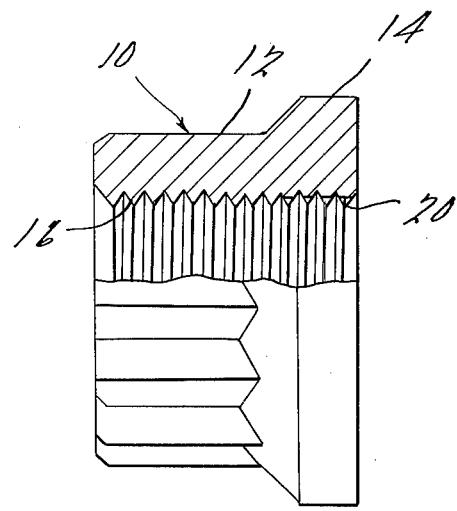
FIG. 2 is a side view, partially in section, of the nut illustrated in FIG. 1.
Figure 3:
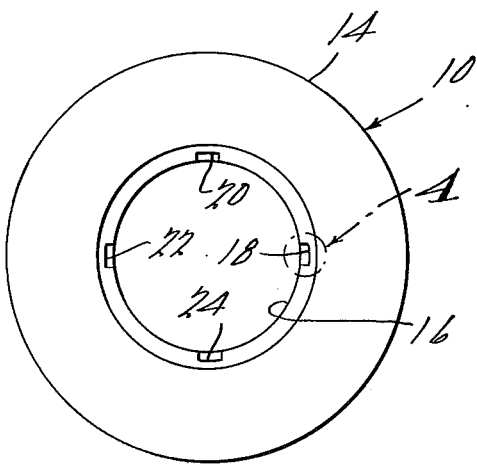
FIG. 3 is a plan view similar to FIG. 1 of the entrance end of the nut.
Figure 4:
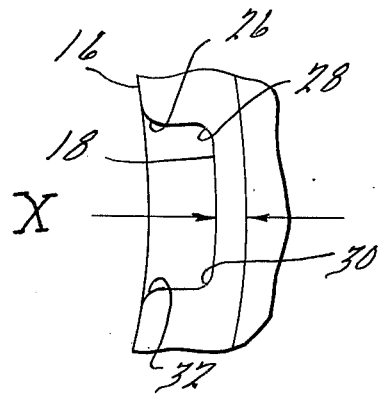
FIG. 4 is an enlarged detail view of a flute taken within the circle 4 of FIG. 3.

In accordance with the present invention, the thread 16 is interrupted by a plurality of circumferentially spaced axially extending flutes 18, 20, 22 and 24 thereby to form what may be termed load distributing threads. In the embodiment shown in FIG. 2, the flutes 18–24 extend axially from the flange 14 through four threads to approximately the midpoint of the thread 16 in the nut 10. The radial depth of the flutes 18–24, as best seen in FIG. 4, is such that the dimension X is not less than approximately twenty percent of thread depth, thereby to minimize the possibility of a stress riser in the body portion 12 of the nut 10.

It has been determined that the benefits of the instant invention can be achieved when approximately 20 percent of the thread flank area is removed from the load distributing threads of the nut. Ratios between the critical dimension of the nut which achieve the foregoing are as follows:

| Dimension | Ratio |
| --- | --- |
| Diameter of threaded member | 25 |
| Circumference of threaded member | 75 |
| Depth of thread | 1.25 |
| Width of flute | 5 |
| Depth of flute | 1 |

From the above ratios, any dimension can be calculated with knowledge of only one dimension.

Stated in another manner, since the percentage of thread desired to be removed from the entrance or load distributing thread is approximately 20 percent, the formula $NAW/TC$ can be used wherein:

$N =$ Number of flutes
$A =$ Depth of flute
$W =$ Width of flute
$T =$ Depth of thread
$C =$ Circumference of threaded member.

An example of how the above formula applies to a ½–20 nut wherein it is desired to employ four flutes is:

$$20\% = \frac{NAW}{TC} = \frac{4 \times .02 \times .1}{.025 \times 1.5}$$

It is to be noted that the flutes have rounded axial edges 26, 28, 30 and 32 to minimize thread cutting or "chasing" at the crest of the thread 16 and to preclude stress risers at the root of the flutes.

Figure 5:
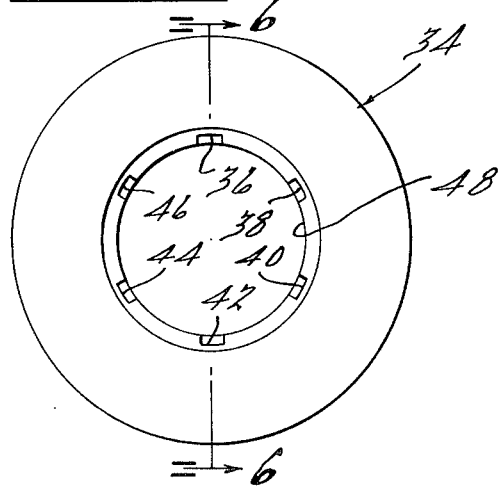
FIG. 5 is a view similar to FIG. 3 of another embodiment of the invention.
Figure 6:
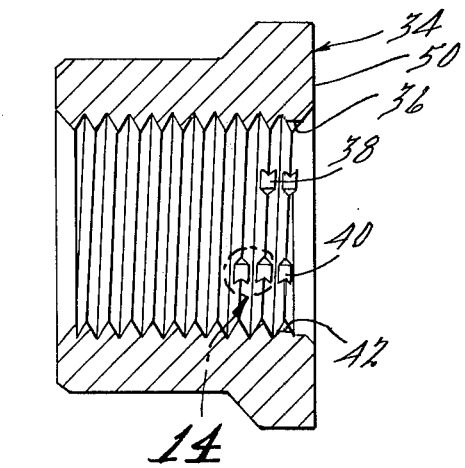
FIG. 6 is a sectional view taken along the line 6—6 of FIG. 5.

Referring to FIGS. 5 and 6, a modified embodiment of the invention comprises a nut body 34 having six flutes 36, 38, 40, 42, 44 and 46 in the threads 48 therein of three different axial lengths. Opposite pairs of the flutes 36–46 are the same length to balance stress on the nut body 34. By varying the length of the flutes 36–46, progressively decreasing flexibility of the threads 48 is achieved in the axial direction inwardly of an entrance end 50 of the nut 34 thereby to gradually increase load transfer between the nut 34 and a bolt inwardly of the nut 34.

FIG. 7 of the drawings is an etched cutaway view of a conventional nut 52 on a complimentary bolt 54. The nut 52 and bolt 54 combination was subjected to a tension-tension fatigue test resulting in failure of the bolt 54 along a crack 56. The failure zone, indicated by dashed lines 58 and 60, envelopes the interface 61 between the engaged and unengaged threads of the bolt 54.

By way of comparison, FIG. 8 illustrates an etched cutaway view of a nut 62 and bolt 64 combination wherein the nut 62 is provided with flutes 66 and 68 in accordance with the instant invention. The nut 62 and bolt 64 combination was subjected to a tension-tension fatigue test resulting in failure of the bolt 64 along a line 70. The failure zone of the bolt 64 is indicated by dashed lines 72 and 74 and is located generally at the midpoint of the nut 62 indicating that the zone of maximum stress transfer has been moved axially away from an interface 76 between the engaged and non-engaged threads of the bolt to a zone adjacent the inner end portions of the flutes 66 and 68.

Referring to FIG. 9 of the drawings, a tension-tension fatigue performance curve of the nut 10 of the instant invention, as compared to a conventional nut, demonstrates that the fatigue improvement nut 10 herein disclosed has a significantly superior fatigue life relative to the conventional nut. Tension-tension fatigue testing is the loading of a nut-bolt combination at a constant amplitude cyclic rate between a high tensile load and a low tensile load until fatigue failure occurs. Ratio of a high load to low load conventionally employed is $R = 0.1$.

Figure 10:
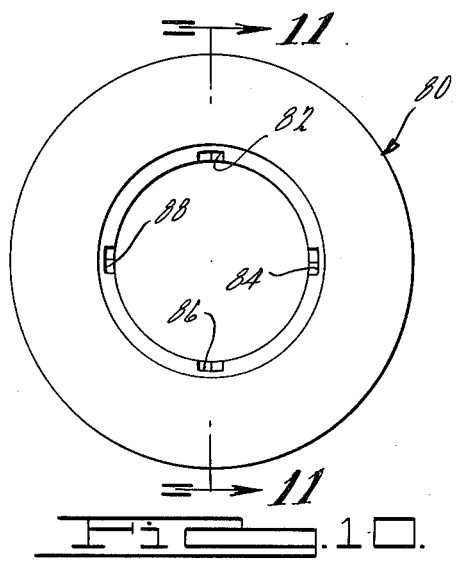
FIG. 10 is a view, similar to FIG. 3, of another embodiment of the invention.
Figure 11:
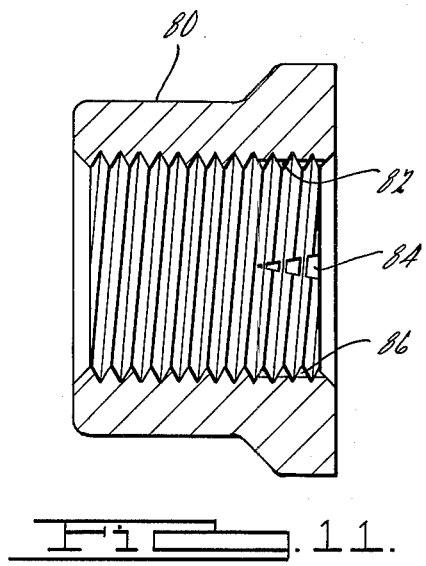
FIG. 11 is a view taken along the line 11—11 of FIG. 10.

Referring to FIGS. 10 and 11, another embodiment of the present invention comprises a nut 80 having flutes 82, 84, 86 and 88 therein which, as best seen in FIG. 11 of the drawings, taper from a circumferential dimension approximately five times the depth thereof at the entrance end of the nut 80 to a relatively small circumferential dimension axially inwardly of the nut 80.

Figure 12:
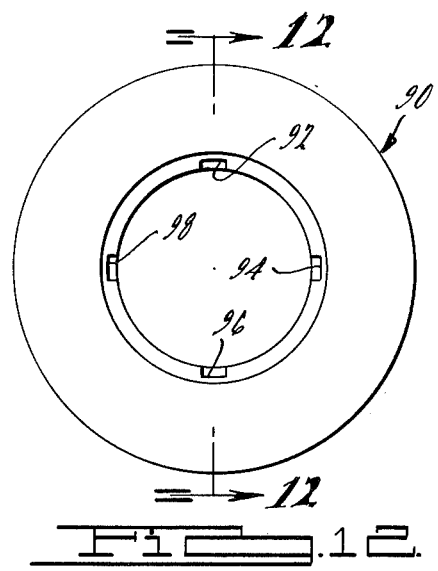
FIG. 12 is a view, similar to FIG. 3, of yet another embodiment of the invention.
Figure 13:
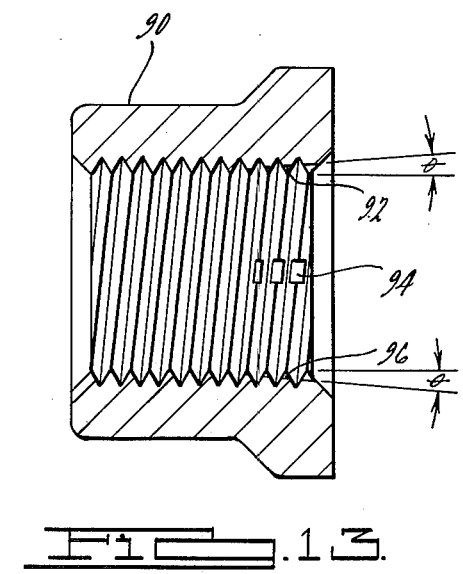
FIG. 13 is a view taken along the line 13—13 of FIG. 12.
Figure 14:
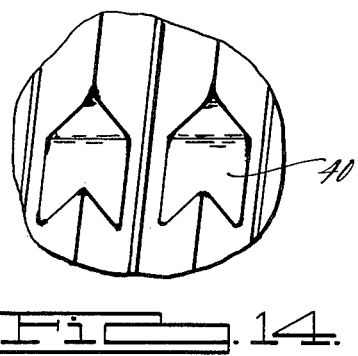
FIG. 14 is a view taken within the circle 14 of FIG. 6.

Referring to FIGS. 12 and 13 of the drawings, yet another embodiment of the present invention comprises a nut 90 having flutes 92, 94, 96 and 98 therein. The flutes 92–98 are of constant circumferential width but decrease in depth from approximately four-fifths thread depth at the entrance end of the nut 90 to zero depth at a midpoint axially inwardly of the nut. As seen in FIG. 13, the angle of taper of the flutes 92-98 is designated by the angle $\theta$.

From the foregoing, it should be apparent that the threads at the entrance end of the nut of the instant invention exhibit a carefully controlled flexibility in the axial direction. The threads at the entrance end thus function as a shock absorber or buffer zone to effect gradual distribution of stress to the full threads of the nut, thence to the threads of a mating bolt thereby transferring the location of maximum stress transfer between the nut and bolt to a zone approximately midway of the axial length of the nut and away from the interface between the engaged and unengaged threads of the bolt.

We claim:

1. In a fatigue improvement nut comprising a generally cylindrical nut body with a wrenching surface on the outer periphery and a threaded central bore for use with a conventional bolt, the improvement comprising a plurality of circumferentially spaced flutes in the threads of said nut extending axially from the bolt entrance end thereof across at least two threads and radially into the threads to approximately four-fifths of thread depth, thereby to weaken said threads sufficiently to allow axial flexure thereof relative to the uninterrupted threads of said nut when subjected axial loads thereby to move the zone of maximum stress transfer between said nut and said bolt from the interface between the engaged and non-engaged threads of said bolt to a zone located substantially centrally of the axial length of said nut.

2. The fatigue improvement nut of claim 1 wherein said flutes are of different axial length to progressively decrease flexibility of the threads of the nut axially inwardly thereof to progressively increase load transfer capability between said nut and bolt axially inwardly of said nut.

3. The fatigue improvement nut of claim 1 wherein said flutes are of constant circumferential dimension but taper in radial depth from a maximum of approximately four-fifths thread depth at the entrance end of said nut to run-out midway of the axial length of said nut.

4. The fatigue improvement nut of claim 1 wherein the radial depth of said flutes is constant at approximately four-fifths thread depth, but the circumferential width thereof decreases from a maximum of approximately five times flute depth at the entrance end of the nut to a minimum midway of the axial length of the nut.

5. The fatigue improvement nut of claim 1 wherein approximately 20 percent of the flank area of the threads is removed by said flutes and said flutes have a dimensional relationship to the nut in accordance with the equation:

$$20\% = NAW/TC$$

wherein:

$N =$ Number of flutes
$A =$ Depth of the flutes
$W =$ Width of the flutes
$T =$ Depth of the thread
$C =$ Circumference of the thread.

* * * * *